United States Patent [19]
McLean

[11] Patent Number: 6,128,658
[45] Date of Patent: Oct. 3, 2000

[54] SELF-INITIATED SYSTEM EVENT USING NETWORK RESOURCES

[75] Inventor: David Peter McLean, Mountain View, Calif.

[73] Assignee: 3COM Corporation, Santa Clara, Calif.

[21] Appl. No.: 09/177,706

[22] Filed: Oct. 22, 1998

[51] Int. Cl.[7] ........................... G06F 15/173; G06F 15/16
[52] U.S. Cl. ......................... 709/224; 709/225; 709/217; 709/218
[58] Field of Search ................................... 709/224, 225, 709/217, 218

[56] References Cited

U.S. PATENT DOCUMENTS

| | | | |
|---|---|---|---|
| 5,841,975 | 11/1998 | Layne et al. | 709/203 |
| 6,023,507 | 2/2000 | Wookey | 380/21 |

*Primary Examiner*—Krisna Lim
*Attorney, Agent, or Firm*—Wagner, Murabito & Hao LLP

[57] ABSTRACT

A method for testing the remote wake-up function of a computer system, wherein the computer system includes a circuit for performing the wake-up function in response to a wake-up packet. First, the computer system sends over the network a broadcast message that includes the network address of the computer system. The broadcast message requests one or more directed responses from the computer systems on the network, where the directed responses represent directed test wake-up packets. Subsequently, the computer system receives the directed test wake-up packets and generates a list of computer systems, and the network address associated with each of the computer systems, that responded to the broadcast message. The computer system then sends directed messages to a subset of the list of computer systems that responded to the broadcast message, where each of the directed messages requests that the subset of computer systems send a delayed test wake-up packet. Next, the computer system powers down, and then wakes up in response to the aforementioned circuit receiving one of the delayed test wake-up packets. In this manner, the present invention provides a method for initiating and executing a self-test of the remote wake-up function.

23 Claims, 8 Drawing Sheets

SELF-INITIATED SYSTEM EVENT USING NETWORK RESOURCES

TECHNICAL FIELD

The present invention relates to the field of computer system networks. In particular, the present invention pertains to the remote wake-up function of a computer system in a network.

BACKGROUND ART

Computer systems linked to each other in a network are commonly used in businesses and other organizations. Computer system networks ("networks") provide a number of benefits for the user, such as increased productivity, flexibility and convenience, and resource sharing and allocation.

One advantage of a network is that the interconnected computer systems allow users to share files, applications and other resources with the network and among themselves. Another advantage of networks is that they are typically equipped with modems and other remote communications equipment, and so are accessible from remote locations. For example, with the proper equipment a network that is physically housed and utilized within an office building can be accessed by a user from another location inside or outside the building, such as the user's home, or from virtually any other geographical location regardless of the distance. In such a case, the user uses a modem to connect his/her remote computer system to the network over a land line. This capability is clearly of convenience to a user, allowing the user to access and utilize the resources of the network from a remote location, placing the user in an office environment without having to actually be in the office.

Accordingly, network providers are motivated to develop and improve features that facilitate remote access. One such available feature allows a remote user to start up (or "wake up") a computer system connected to a network. Using a remote computer system that is properly configured to allow access to the network, the user connects to the network, identifies the computer system of interest on the network (referred to herein as the user's "local" computer system), and commands the networked local computer system to wake up. Such a feature is advantageous because it provides the remote user with access to files and other information stored on the local computer system that would not be otherwise available without having the local computer system up and running. Hence, a user who has, for example, left the office can retrieve a forgotten file stored on his/her local computer system without having to return to the office.

At the time when the remote wake-up function is installed on the local computer system, or when a computer system so equipped is first connected to a network, it is necessary for the installer or technician to perform a diagnostic test to ensure that the function performs properly. In the prior art, the installer accomplishes this by shutting down the local computer system on which the remote wake-up function is being tested and then, through a remote computer system on the network, remotely accessing the local computer system and directing it to turn back on.

The prior art techniques of testing the remote wake-up function have numerous associated disadvantages. Foremost, it is necessary for the installer to have personal physical access to another computer system in order to remotely access the computer system being tested. However, a remote computer system may not be conveniently available to the installer. Often, another available computer system is not in the same office or proximity as the computer system to be tested. Once a remote computer system is located, the user of that computer system is likely to be inconvenienced while the installer borrows it to conduct the test. If the computer system is not being used, the installer needs to know passwords in order to be able to log on to it and to the network. All of these inconveniences add time and cost to the testing procedure.

In addition, prior art testing techniques are problematic because they also require the installer to type in the network address of the local computer system being tested. Thus, the installer must either have knowledge of the network address or know how to manually obtain it. The process of remembering and then subsequently typing in the address (on the remote computer system) is also prone to error. It would be advantageous to eliminate the step of manually obtaining the network address of the local computer system.

Finally, a disadvantage to the prior art techniques is that the installer must also determine whether the remote computer system to be used to perform the testing is configured and enabled with the required remote wake-up software, e.g., TCP/IP (Transmission Control Protocol/Internet Protocol) and any other software required to perform the test. If not, the installer is left to either installing the necessary software on the remote computer system or searching for another remote computer system that is properly configured and can be used to conduct the test.

The disadvantages to the prior art that are identified above are compounded by the fact that, in the case where an entire network is being updated with the remote wake-up function, the installer is likely to be installing and testing that function on a large number of computer systems in a short period of time. Thus, the task of testing the remote wake-up function on numerous computer systems using the prior art techniques is burdensome and time-consuming.

Accordingly, a need exists for a convenient method for performing a diagnostic test of the remote wake-up function of a computer system. A further need exists for a testing method that is user-friendly and efficient. The present invention solves these needs. These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a convenient method for performing a diagnostic test of the remote wake-up function of a computer system. The present invention also provides a user-friendly and efficient testing method. The present invention described herein provides a method for testing the remote wake-up function of a networked computer system by self-testing the computer system on which that function has been installed.

Specifically, in one embodiment, the present invention is implemented as computer-readable instructions stored on and executed by a computer system (the computer system being tested) in a network of computer systems. The computer system includes a circuit that is for performing a wake-up function in response to a wake-up packet. In operation, the computer system sends over the network a broadcast message that includes the network address of the computer system. The broadcast message requests one or more directed responses from the other computer systems on the network, where the directed responses represent directed test wake-up packets. Subsequently, the computer system receives the directed test wake-up packets and generates a list of computer systems, and the network address associated with each of the computer systems, that responded to the broadcast message. The computer system then sends directed messages to a subset of the list of computer systems that responded to the original broadcast message, where each of the directed messages requests that each computer system of the subset list of computer systems send a delayed test wake-up packet to the computer system. Next, the computer system powers down, and then wakes up in response to the aforementioned circuit receiving one of the delayed test wake-up packets. The physical wake-up thus provides a test of the wake-up functionality of the computer system.

In the present embodiment, a network interface card (NIC) is used to couple the computer system to the network. The NIC is configured (as part of the installed remote wake-up function) to wake up the computer system in response to a wake-up packet. In the present embodiment, the network addresses for the computer system and for the computer systems on the network are the ethernet addresses for those computer systems.

In one embodiment, in order to verify the availability of the subset of the list of computer systems that responded to the broadcast message, the computer system, prior to powering down, sends directed non-delay messages (that is, requesting a time delay of zero seconds for a test wake-up packet) to each computer system in the subset list of computer systems. After receiving any responses, the computer system checks them against the subset of the list of computer systems. The computer system is thereby able to identify the subset of computer systems available to perform the test, and then sends directed messages requesting a delayed test wake-up packet to the subset of computer systems available. If this verification step demonstrates that there are no computer systems available, or if the number of computer systems available is not sufficient, then another broadcast message can be sent to generate a new list of computer systems.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., the process of FIGS. 4), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
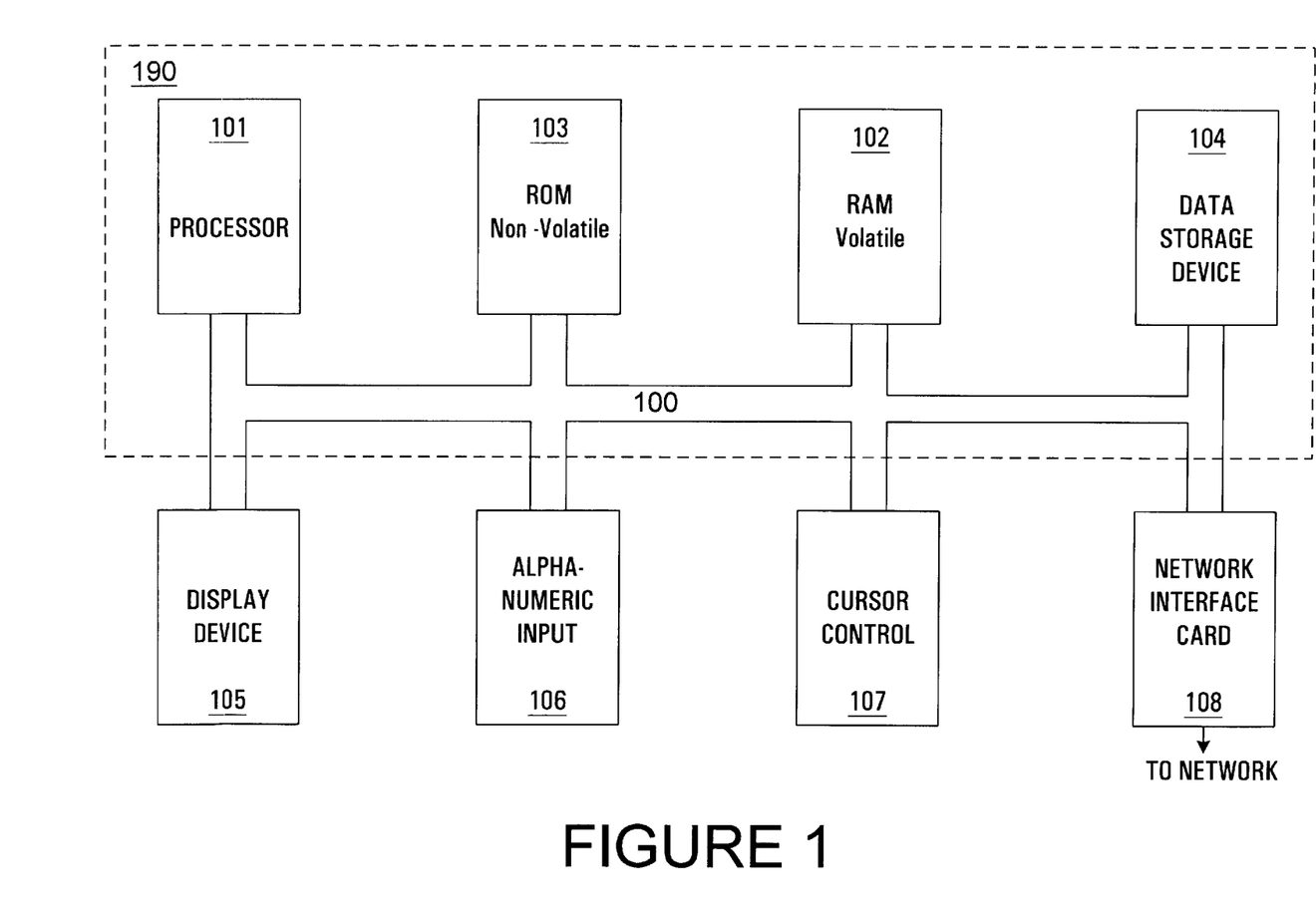
FIG. 1 shows a general purpose computer system upon which embodiments of the present invention may be implemented.

Refer to FIG. 1 which illustrates a general purpose computer system 190. Computer system 190 is one of a plurality of computer systems communicatively coupled in a network. In general, computer system 190 used by the embodiments of the present invention comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, a display device 105 coupled to bus 100 for displaying information to the computer user, an optional alphanumeric input device 106 including alphanumeric and function keys coupled to bus 100 for communicating information and command selections to central processor 101, an optional cursor control device 107 coupled to bus 100 for communicating user input information and command selections to central processor 101, and a network interface card (NIC) 108 coupled to bus 100 for communicating to and from a network.

NIC 108 is implemented such that it contains circuitry for recognizing certain wake-up packets that it receives over the network even though the remainder of computer system 190 is shut down.

Display device 105 of FIG. 1 utilized with computer system 190 of the present invention may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

Figure 2:
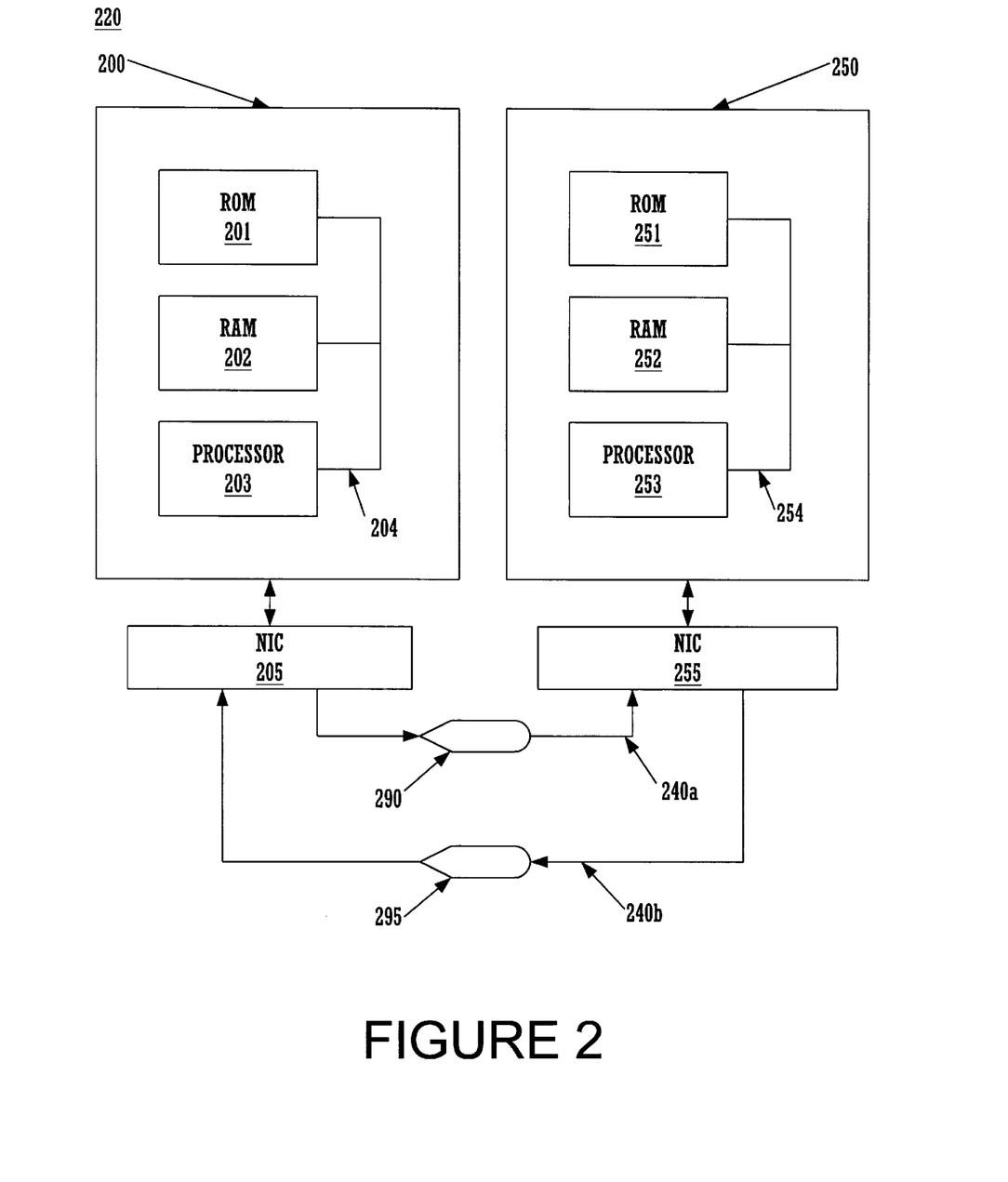
FIG. 2 is a block diagram showing two computer systems of FIG. 1 linked in a computer system network in accordance with one embodiment of the present invention.

With reference now to FIG. 2, a diagram is provided showing two computer systems 200 and 250 coupled in network 220. In a typical network, there are a plurality of computer systems coupled to each other with communications equipment. For the discussion herein, a first computer system 200 is shown coupled via a communications line with a second computer system 250, but more computer systems could be employed. For clarity, the communications line is shown as two communication lines 240a and 240b in order to illustrate the flow of data packets (alternatively referred to as frames) in two directions between computer system 200 and computer system 250. Data packet 290 is shown traveling from computer system 200 to computer system 250, and likewise data packet 295 is shown traveling from computer system 250 to computer system 200.

As explained in conjunction with FIG. 1, computer system 200 of FIG. 2 incorporates ROM 201, RAM 202 and processor 203 coupled by bus 204, and similarly computer system 250 incorporates ROM 251, RAM 252 and processor 253 coupled by bus 254. Computer system 200 and computer system 250 are each connected to network 220 by network interface cards (NICs) 205 and 255, respectively.

In accordance with the present invention, computer system 200 incorporates a remote wake-up function and requires testing to ensure its functionality. In general, the remote wake-up function enables a user at a remote location to start up (e.g., wake up) computer system 200. The software component of the remote wake-up function is implemented as computer-readable instructions stored in ROM 201 and/or RAM 202 and executed by processor 203. The hardware component of the remote wake-up function is implemented in a circuit incorporated into computer system 200. In the present embodiment, the circuit for performing the remote wake-up function is a network interface card (e.g., NIC 205).

NIC 205 is configured to start up computer system 200 in response to a command from a remote user. For example, in one NIC configuration, a cable or connector is used to plug NIC 205 into the motherboard (not shown) of computer system 200, and thereby NIC 205 taps into the power supply of computer system 200. In another configuration, NIC 205 is connected to the power supply using pins in a peripheral component interconnect (PCI) slot of computer system 200.

The present invention provides a method for testing the installation and functionality of the remote wake-up function after that function has been first installed in a computer system. Hence, in accordance with the present invention, after the remote wake-up function is installed on computer system 200, a diagnostic test is performed to make sure that the remote wake-up function has been correctly installed and will function properly. As described above, the hardware portion of the remote wake-up function is typically incorporated into the NIC, and thus that function is installed on computer system 200 when NIC 205 (and supporting software) is installed. In the present embodiment, the software associated with the present invention test method is also typically installed on computer system 200 as part of the same procedure used to install NIC 205.

As will be explained herein below, the present invention initiates the diagnostic test from computer system 200 and automatically utilizes other computer systems on the network that have the capability to generate a remote wake-up message (e.g., another computer system on which the remote wake-up function has been installed) to help perform the test. Thus, the present invention advantageously employs the shared resources available in a network. The present invention also provides a convenient method to accomplish the diagnostic test. Because the test is initiated by the computer system on which the remote wake-up function has been installed (e.g., computer system 200) and since computer system 200 automatically discovers and uses computer system 250, it is not necessary for the installer to search out another computer system that is properly equipped and configured, as well as available, in order to perform the test. Also, in accordance with the present invention, it is not necessary for the installer to know the network address of computer system 200 or to type the network address because this information is automatically communicated to computer system 250.

FIGS. 3A–3D show a plurality of computer systems (e.g., computer system 190 of FIG. 1) communicatively coupled in a network (e.g., network 220 of FIG. 2) by network bus 240. The remote wake-up function is installed on computer system 200 and it is necessary for the installer to perform a diagnostic test to ensure that function is properly installed. FIGS. 3A–3D illustrate the flow of information between the computer systems on the network in accordance with an embodiment of the present invention. Details regarding the test method implemented in accordance with the present invention are provided below in conjunction with FIG. 4.

Figure 3A:
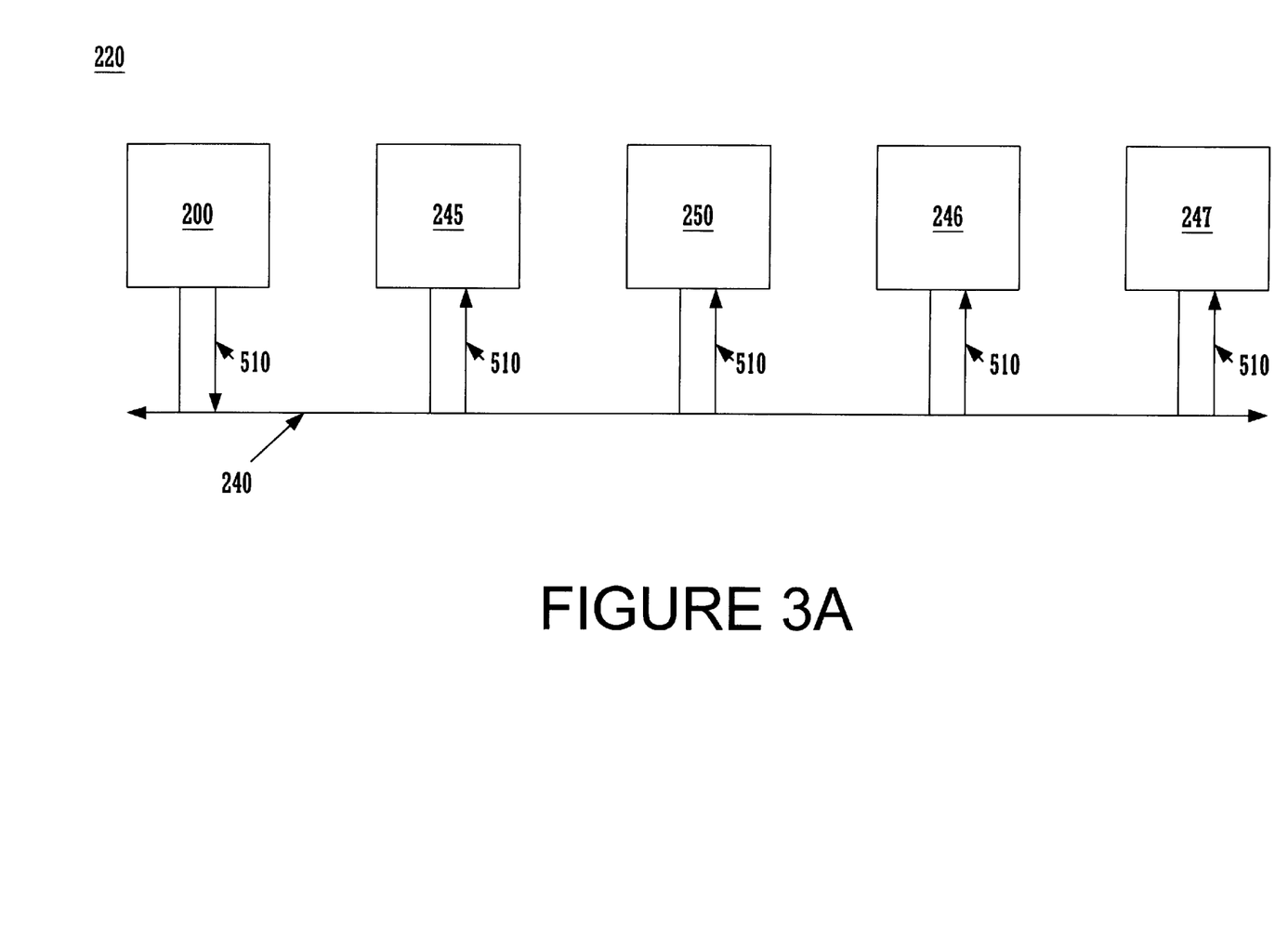
FIGS. 3A, 3B, 3C and 3D are diagrams illustrating the flow of data packets in an exemplary computer system network in accordance with one embodiment of the present invention.

With reference first to FIG. 3A, while powered on, computer system 200 sends broadcast message 510 (e.g., data packet 290 of FIG. 2) over network 220 to each computer system 245, 246, 247 and 250 on the network. The purpose of the broadcast message is to request a response back from those computer systems that have the capability to generate a remote wake-up message. The broadcast message includes the network address of computer system 200 so the reply messages can be properly directed back to computer system 200. In the present embodiment, the network address is the ethernet address of computer system 200, although it is appreciated that other means may be used to identify a specific computer system on the network. As will be explained in greater detail herein, those computer systems having the capability of generating a remote wakeup message are used in the process employed in accordance with the present invention to perform the test of the remote wake-up function.

Figure 3B:
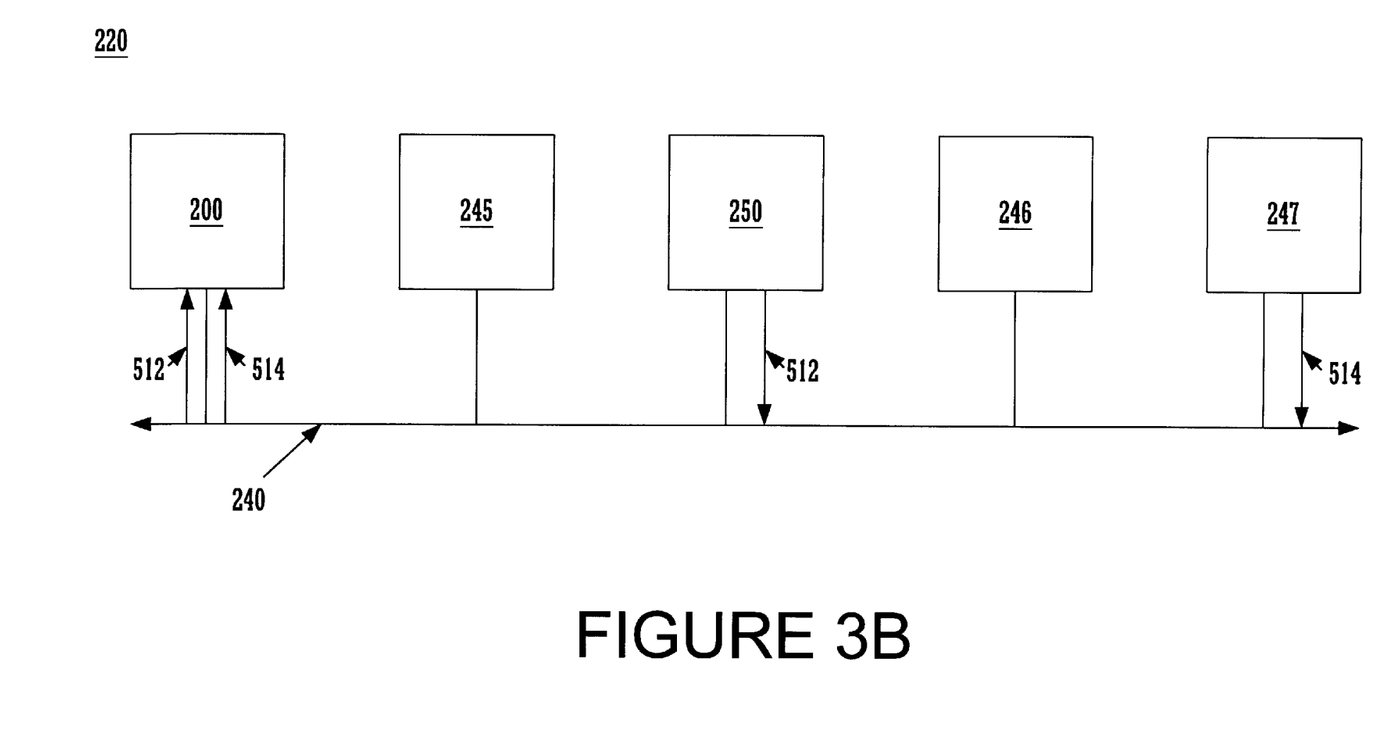

With reference now to FIG. 3B, computer system 200 receives via network 220 a directed response or reply message (e.g., data packet 295 of FIG. 2) from each of those computer systems having the capability of generating a remote wake-up message, e.g., directed responses 514 and 512 from computer systems 247 and 250, respectively. The purposes of the directed response messages are to indicate that the computer systems that sent the response have this capability, and to provide the network addresses for those computer systems. Response messages 514 and 512 from computer systems 247 and 250 are directed responses; that is, they have as a destination address the address of computer system 200, and are therefore sent specifically to computer system 200 and are not received by other computer systems on network 220. In response messages 514 and 512, computer systems 247 and 250 also provide their associated network addresses. In the present embodiment, the network address is the ethernet address of each of computer systems 247 and 250, although it is appreciated that other means used to identify a specific computer system on the network are permitted by the present invention.

Figure 3C:
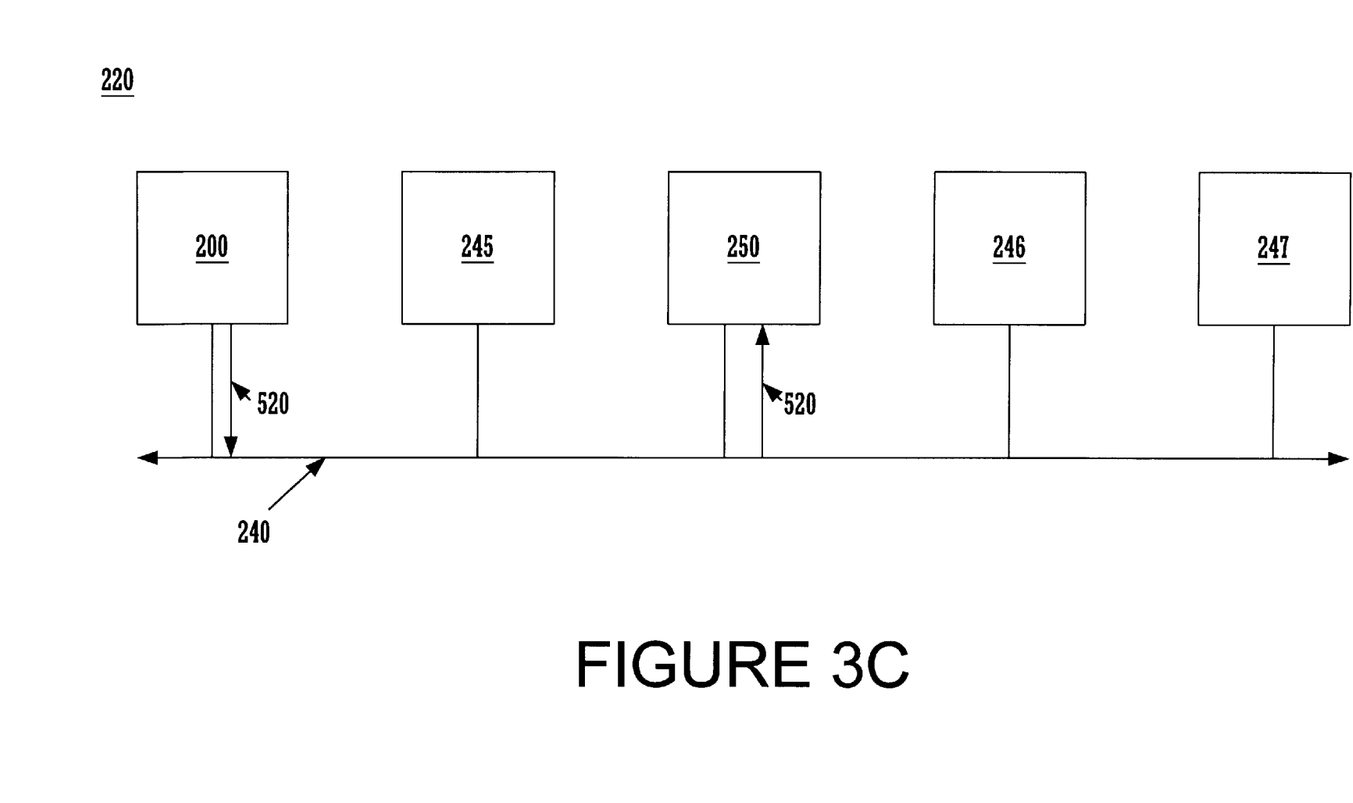

With reference next to FIG. 3C, based on the network addresses provided in the response messages, computer system 200 sends request message 520 (e.g., data packet 290 of FIG. 2) to a subset of the computer systems that responded to the broadcast message (e.g., computer system 250) via network 220. Request message 520 from computer system 200 is a directed message; that is, it is sent specifically to computer system 250 and not to other computer systems on network 220. The purpose of request message 520 is to request that computer system 250 send a wake-up packet to computer system 200.

Figure 3D:
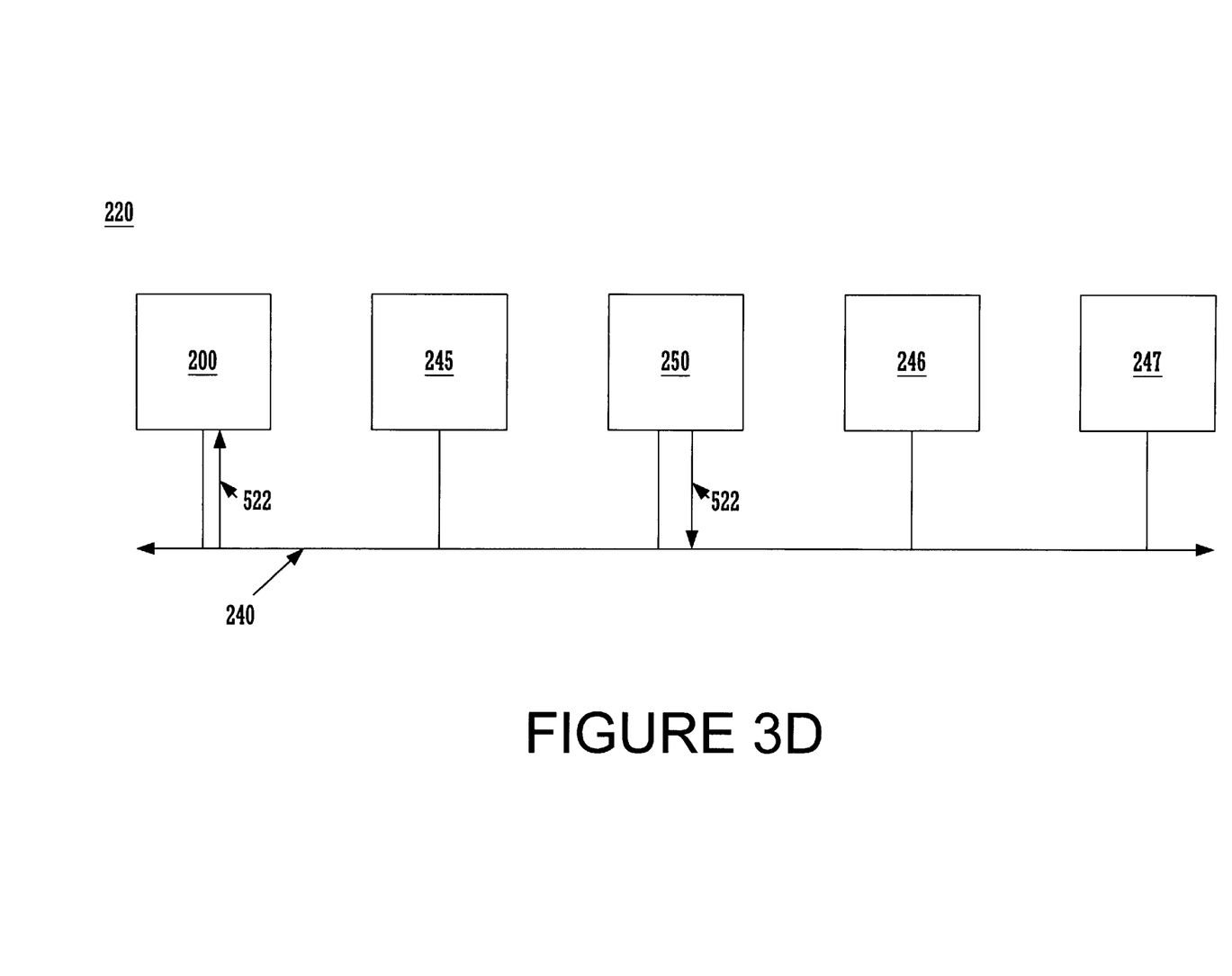

With reference to FIG. 3D, computer system 250 sends directed wake-up packet 522 to computer system 200 via network 220. As will be explained in detail below, after sending directed request message 520 as described in conjunction with FIG. 3C, the present invention powers down computer system 200. Hence, in accordance with the present invention, wake-up packet 522 received by computer system 200 from computer system 250 causes computer system 200 to start up provided the remote wake-up function has been properly installed on computer system 200 and is performing properly. Therefore, the present invention provides a means by which the remote wake-up functionality can be tested on computer system 200.

Figure 4:
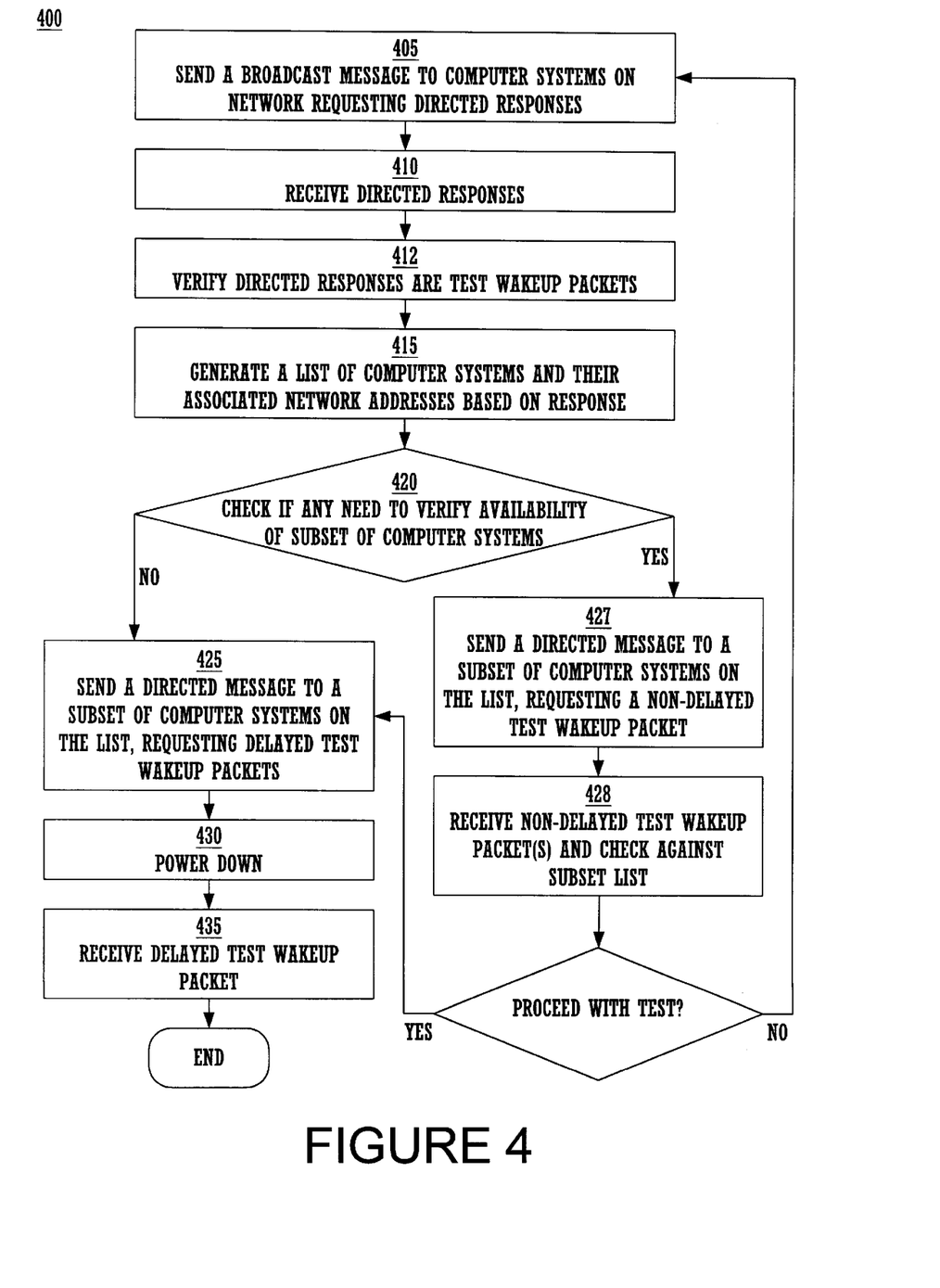
FIG. 4 is a flowchart of a process for testing a computer system in accordance with one embodiment of the present invention.

Refer now to FIG. 4, which is a flowchart of process 400 for performing a test of the remote wake-up function of a computer system (e.g., computer system 200 of FIG. 3A) in accordance with the present embodiment of the present invention. Process 400 is implemented as computer-readable instructions stored in ROM 201 and/or RAM 202 and executed by processor 203 in computer system 200 of FIG. 2. Thus, aspects of the present invention are implemented on the computer system on which the remote wake-up function is to be tested. Hence, the installer is able to initiate the test from the computer system to be tested, and there is no need for the installer to search for another computer system on the network in order to perform the test. Also, in accordance with the present invention, it is not necessary for the installer to manually obtain and then type in the network address of computer system 200, because this information is automatically retrieved by computer system 200 and communicated to other computer systems on the network. In addition, because the remote wake-up function is installed on the computer system to be tested, the computer system is known to be properly configured and available both for network access and for the test itself.

In the present embodiment, process 400 is installed as software on computer system 200 at the same time that the remote wake-up function is installed on that computer system. That is, the hardware component of the remote wake-up function is installed on computer system 200 via NIC 205, and the software associated with the remote wake-up function is also installed at that time. In the present embodiment, as part of the procedure of installing the remote wakeup function on computer system 200, the software for the present invention test method is also installed on that computer system. It is understood that other procedures may be used to install the remote wake-up function and the present invention test method on the computer system to be tested.

With reference still to FIG. 4 and also back to FIG. 3A, in step 405 computer system 200 (that is, the computer system on which the remote wake-up function is to be tested) broadcasts message 510 over network 220 to the other computer systems on the network (e.g., computer systems 245, 246, 247 and 250). Broadcast message 510 is received by all computer systems on network 220.

In accordance with the present invention, broadcast message 510 includes the network address of computer system 200. In the present embodiment, the network address is the ethernet address of computer system 200; however, other means of identifying computer system 200 may be used in accordance with the present invention. By including the network address of computer system 200 in broadcast message 510, computer systems 245, 246, 247 and 250 on network 220 automatically receive the network address of the computer system being tested. Hence, the present invention eliminates the need for the installer to determine and type in the network address of the computer system being tested. The present invention is thus convenient to the installer and precludes the potential of a typing error.

Continuing with reference to step 405, broadcast message 510 requests that all compliant computer systems, e.g., computer systems 245, 246, 247 and 250, send test wake-up packets to computer system 200. As such, only those computer systems on network 220 with the capability to generate a wake-up message will respond to broadcast message 510. In this manner, computer system 200 is able to automatically search for and identify those computer systems on network 220 that have the capability to generate a test wake-up packet and thus are able to participate in the test in accordance with the present invention. The present invention thus advantageously identifies and utilizes network resources already available, and does not require special equipment or the installation of additional software on other computer systems on the network.

With reference still to step 405, broadcast message 510 requests directed responses from computer systems 245, 246, 247 and 250. That is, computer system 200 requests that the test wake-up packets sent in response to broadcast message 510 be sent directly to computer system 200 using the network address provided in the broadcast message. Accordingly, the test wake-up packets sent in response to the broadcast message are not sent to other computer systems on network 220 other than computer system 200, so that other computer systems on network 220 are not inadvertently powered on during the test.

In the present embodiment, broadcast message 510 is received by computer systems 245, 246, 247 and 250 at a software layer in these computer systems that is not observable by the users of these computer systems. That is, when these computer systems receive broadcast message 510, this information is not displayed to the users of these computer systems. In addition, any applications being utilized by the users of these computer systems are not adversely interrupted or otherwise affected by reception of broadcast message 510, and thus the test process is transparent to the users of computer systems 245, 246, 247 and 250. In this sense, the data packets sent and received by the computer systems participating in the test are similar to the echo pulses and heartbeat packets commonly exchanged between computer systems in a network and known in the art. Hence, the present embodiment of the present invention does not inconvenience the users of computer systems 245, 246, 247 and 250 while the test is being performed.

With reference now to FIG. 3B and continuing with reference to FIG. 4, in step 410 computer system 200 receives the directed responses (e.g., direct responses 512 and 514) requested in step 405. As discussed above, the directed responses are represented by test wake-up packets. In the scenario illustrated by FIG. 3B, only computer systems 247 and 250 have the capability to send a test wake-up packet, and so only those two computer systems respond. However, it is appreciated that any number of computer systems on network 220 can send a directed response to computer system 200 in accordance with the present invention.

Directed test wake-up packets 514 and 512 sent by computer systems 247 and 250, respectively, include the network address associated with these computer systems. As above, in the present embodiment the network addresses are the ethernet addresses of computer systems 247 and 250; however, other means of identifying these computer systems may be used in accordance with the present invention. In the present embodiment, the network addresses provided in test wake-up packets 512 and 514 are read and stored by computer system 200. Therefore, in accordance with the present invention, there is no need for the installer to know or obtain the network address of those computer systems on the network that are capable of performing the remote wake-up test, nor does the installer need to type these addresses.

In a manner similar to that described above in step 405, in the present embodiment, directed responses 514 and 512 sent by computer systems 247 and 250, respectively, in response to broadcast message 510 are sent from a software layer in these computer systems that is not observable by the users of these computer systems. The directed responses are also sent automatically by computer systems 247 and 250 so that there is no action required by the users of these computer systems. Hence, the present invention is transparent to the users of these computer systems and therefore does not inconvenience the users of computer systems 247 and 250 while the test is being performed.

With reference to step 412 of FIG. 4, computer system 200 verifies that test wake-up packets 512 and 514 received in response to broadcast message 510 are properly formatted wake-up packets. In the present embodiment, computer system 200 performs this step by applying a filter to test wake-up packets 512 and 514. The use of a filter for this purpose is known in the art. In general, a filter screens the test wake-up packet by comparing the bit/byte pattern of the data contained in certain predefined fields of the data packet against specified recognition characteristics that characterize a wake-up packet. In the present embodiment, the test wake-up packet includes a wake-up code as well as the network address of the computer system that sent the packet. Thus, in the present embodiment, computer system 200 compares the data pattern in the data packets it has received against the wake-up code, and data packets that match the recognition characteristics of the wake-up code are verified to be properly formatted test wake-up packets.

Next, in step 415 of FIG. 4, computer system 200 generates a list of computer systems that responded to broadcast message 510. As described above, only those computer systems that have the capability to generate a test wake-up packet are capable of responding to the broadcast message (e.g., computer systems 247 and 250 of FIG. 3B). Also as described above, test wake-up packets 514 and 512 sent by computer systems 247 and 250, respectively, include the network addresses associated with those computer systems, and computer system 200 reads those network addresses and stores them in memory. In the scenario illustrated by FIG. 3B, only two computer systems are shown responding, and hence the list of network addresses would have only two entries; however, it is understood that the present invention can be implemented with any number of computer systems, and their associated network addresses, residing in the list.

Thus, in accordance with the present invention, computer system 200 is able to automatically generate and store a list of computer systems on network 220 that are able to generate a properly formatted test wake-up packet. As such, there is no need for the installer to search for a remote computer system that is configured to perform the remote wake-up functionality test on computer system 200. Instead, this search is initiated and accomplished using the computer system to be tested.

In one embodiment of the present embodiment, the diagnostic test will be performed using a subset of the computer systems that are on the list that is generated in step 415. It is not necessary to perform the diagnostic test using every computer system on the list, since only one test wake-up packet is needed for the test. However, more than one computer system are included in the subset of the list because it is possible for a computer system to be unavailable for the test for some reason (e.g., the computer system is shut off by the user before the test is performed). As described above, the steps of receiving the broadcast message and sending a directed response are accomplished automatically without the users of computer systems 247 and 250 being aware that a test is being performed. Hence, it is possible that one or more of computer systems 247 and 250 (FIG. 3B) was shut down or otherwise removed from network 220 before the test is completed. In the present embodiment, the present invention selects three computer systems to form the subset list; however, any number of computer systems can be used to form the subset list in accordance with the present invention.

In step 420 of FIG. 4, in one implementation of the present invention, the diagnostic test is performed after first verifying that the subset list of computer systems identified in the preceding steps remains available to perform the test. In this implementation of the present invention, the computer systems in the selected subset are contacted again to verify that they remain available and are otherwise capable of participating in the remote wake-up function test. This implementation approach supports a strategy in which the diagnostic test is completed some period of time after the remote wake-up function test is initiated; in other words, the present invention supports the scenario in which the diagnostic test is not completed immediately.

In another implementation of the present invention, the step of verifying that the subset list of computer systems is still available is not performed, because the period between the beginning of the test and the time when the subset of computer systems is contacted again for a test wake-up packet is relatively short. Each of these implementation approaches is discussed below, starting with the case in which verification is not performed.

In step 425 of FIG. 4, and also with reference to FIG. 3C, in the present embodiment, computer system 200 sends directed message 520 to a subset of the computer systems that are on the list that was generated in step 415. That is, one or more computer systems that are on the list (and therefore have the remote wake-up function) are selected, and a message is sent only to those computer systems. In the example illustrated by FIG. 3C, only computer system 250 receives directed message 520; however, it is understood that a directed message can be sent to any number of computer systems on the list in accordance with the present invention. In the preferred embodiment, the directed message is sent to three computer systems, for the reason provided above.

Continuing with step 425, directed message 520 sent by computer system 200 requests that computer system 250 send a test wake-up packet back to computer system 200 after a time delay specified by the installer. The test wake-up packet that is to be sent by computer system 250 is a directed packet sent only to computer system 200. The purpose of the time delay is to allow enough time for computer system 200 to completely power down after sending the directed message before a test wake-up packet is received.

In step 430 of FIG. 4, the present invention automatically shuts down computer system 200. The present invention also functions if computer system 200 is in a sleep state instead of a shut down state.

In step 435 of FIG. 4 and also with reference to FIG. 3D, after the specified time delay, computer system 200 receives from computer system 250 delayed test wake-up packet 522 in response to directed message 520 of step 425. Specifically, in the present embodiment, delayed test wake-up packet 522 is received by NIC 205 (FIG. 2) of computer system 200. As described above, NIC 205 is configured to wake up computer system 200 in response to delayed test wake-up packet 522.

A successful test of the remote wake-up function occurs when computer system 200 starts up in response to delayed test wake-up packet 522, as observed by the installer. Thus, the present invention test method not only determines whether the remote wake-up function is properly installed (that is, that NIC 205 is correctly plugged in), but also determines whether the remote wake-up function is performing properly.

Note that in the case where directed message 520 of step 425 is sent to more than one computer system, computer system 200 responds only to the first delayed test wake-up packet that is received. Subsequent delayed test wake-up packets received by computer system 200 have no effect and thus are essentially ignored, because the computer system is either in the process of starting up or has completed the startup process.

Step 427 of FIG. 4 addresses the case in which the installer chooses to verify the availability of the subset list of computer systems; for example, if the elapsed time between steps 415 and 425 is significant, the installer may choose to perform the verification step. In the same manner as that described in step 425, computer system 200 sends directed message 520 to the subset of computer systems that are on the list generated in step 415. That is, one or more computer systems that are on the list (and therefore have the capability to generate a test wake-up packet) are selected, and a message is sent only to those computer systems. In the example illustrated by FIG. 3C, only computer system 250 receives directed message 520; however, it is understood that a directed message can be sent to a subset of the list consisting of any number of computer systems in accordance with the present invention. In the preferred embodiment, the directed message is sent to three computer systems, for the reason discussed above.

Continuing with step 427, directed message 520 sent by computer system 200 requests that computer system 250 send a test wake-up packet back to computer system 200 after a time delay of zero. Hence, computer system 200 will immediately receive non-delayed test wake-up packet 522 from computer system 250 and also from other computer systems in the subset.

In step 428, one or more non-delayed test wake-up packets (e.g., non-delayed test wake-up packet 522) are received by computer system 200. The receipt of these packets provides the indication needed to verify that there are computer systems available to perform the diagnostic test. Non-delayed test wake-up packet 522 does not cause computer system 200 to wake up because the immediate nature of the response does not allow time for computer system 200 to shut down. The immediate nature of the response also does not delay the test process and thus assures that the subset of computer systems will remain available for the test. Because more than one computer system is included in the subset list (in the preferred embodiment, three computer systems are in the subset list), it is likely that at least one computer system will remain available for the test.

As described previously, a test wake-up packet contains the network address of the computer system that sent the packet. Thus, computer system 200 can check the network addresses provided by the non-delayed test wake-up packets received in step 428 against the subset of the list of computer systems to which the directed message was sent. If a non-delayed test wake-up packet is not received from a computer system in that subset, a new subset can be generated if so desired before proceeding with the test. Otherwise, the test can proceed in accordance with steps 425, 430 and 435 of the present invention.

In the manner described by process 400 of FIG. 4, the present invention provides a convenient, user-friendly and efficient method for performing a diagnostic test of the remote wake-up function of a computer system. One exemplary implementation of process 400 is provided in the Code Sections below.

Code Section A provides one exemplary implementation of the present software code used to send out broadcast and directed messages, generate a list of computer systems on the network that have the remote wake-up function, generate a subset of that list, verify that the data packets received are wake-up packets, specify a time delay, and execute the overall test process.

Code Section A—Remote Wake-up Test

---

```
RESID PROTOCOL::TestRemoteWakeupRestart (INT16 timeUntilWake)
{
  if (findWakeCohort(1) != SUCCESS) findWakeCohort(0);
  if (cohortCount < 1) return ERROR_echo;
  RESID pitchResult = pitchWake(timeUntilWake, FALSE);
```

-continued

```
   if (pitchResult != SUCCESS) return pitchResult;
   PrepareForShutdown();
   shutdown();
   return ERROR_shutdown;
}
RESID PROTOCOL::TestRemoteWakeup(void)
{
   RESID retVal;
   for (UINT8 loopCount=0; loopCount < 6; loopCount++)
   {
      SetAdapterRxFilter(NDIS_PACKET_TYPE_DIRECTED);
      retVal = findWakeCohort(0);
      if (retVal == SUCCESS) break;
   }
   if (retVal) return retVal;
   return SUCCESS;
}
RESID PROTOCOL::pitchWake(INT16 wakeDelay, UINT8 broadcast)
{
   UINT tex;
   WORD wakeRequestLen = InitEchoFrame(wakeRequestFrame);
   wakeRequestFrame->echo.type = Byteswap(WAKE_REQUEST);
CopyMemory((PVOID)wakeRequestFrame->source, StationAddress,
(DWORD) 6);
wakeRequestFrame->echo.sequenceNumber = Byteswap (wakeDelay);
if (broadcast==TRUE)
{
   CopyMemory((PVOID)wakeRequestFrame->destination,bcast_addr,
(DWORD) 6);
      for(UINT tx_retry = 0; tx_retry < 3; tx_retry++)
      {
         tex = Transmit((FRAME*) wakeRequestFrame, wakeRequestLen );
         if (tex == SUCCESS) break;
      }
      if((tx_retry == 3) && (tex != SUCCESS)) return ERROR_TxFail;
}
else
{
   if (cohortCount == 0) return FALSE;
   for (UINT8 pitches = 0; pitches < cohortCount; pitches++)
   {
      CopyMemory((PVOID)wakeRequestFrame-
>destination,cohort[pitches],(DWORD) 6);
      for(UINT tx_retry = 0; tx_retry < 3; tx_retry++)
      {
         tex = Transmit((FRAME*) wakeRequestFrame,
wakeRequestLen);
         if (tex == SUCCESS) break;
      }
      if((tx_retry == 3) && (tex != SUCCESS)) return ERROR_TxFail;
   }
}
   return SUCCESS;
}
RESID PROTOCOL::findWakeCohort(INT8 find)
{
   USHORT rxSize;
   RESID goodPitch;
   const long FrameTime = 1000;
   time_t StartTime, CurrentTime;
   cohortCount = find;
   if (find == TRUE)
   {
      goodPitch = pitchWake(0, FALSE);
   }
   else goodPitch = pitchWake(0, TRUE);
   if (goodPitch != SUCCESS) return goodPitch;
   goodPitch = 0;
   StartTime = CurrentTime = GetTickCount();
   do
   {
      USHORT rx_status = Receive((FRAME*)&rxWake, sizeof rxWake,
&rxSize);
      if(rx_status != SUCCESS) return ERROR_RxFail;
      if (rxSize != 0)
      {
         if ( isWakePacket() )
         {
            if (!(find))
```

-continued

```
            {
               CopyMemory(cohort[cohortCount],rxWake.source,
(DWORD) 6);;
               cohortCount++;
            }
            else goodPitch++;
         }
      }
   }while( InGoodTime( &StartTime, &CurrentTime, FrameTime ) &&
(cohortCount < 3) );
   if (find)
   {
      if (goodPitch < cohortCount) return FAIL;
   }
   else if (cohortCount < 1) return ERROR_echo;
   return SUCCESS;
}
```

Code Section B provides an example of the software code used to verify that a data packet received by computer system 200 is a wake-up packet (step 412 of FIG. 4).

Code Section B—Verify Wake-up Packets

```
UINT8 PROTOCOL::isWakePacket()
{
   INT8 addressIndex;
   for (addressIndex = 5; addressIndex >= 0; addressIndex--)
   {
      if (rxWake.addreps[(addressIndex)] != StationAddress[addressIndex])
return FALSE;
   }
   if (Byteswap(WORK(rxWake.size)) != 102) return FALSE
   for (addressIndex = 5; addressIndex >=0; addressIndex--)
   {
      for (INT8 addressCount = 1; address Count < 16; addressCount++)
      {
         if (rxWake.addreps[(addressCount*6+addressIndex)] !=
StationAddress[addressIndex]) return
            FALSE;
      }
   }
   for (INT8 fHeader = 0; fHeader < 6; fHeader++)
   if (rxWake.preadrs[fHeader] != 0xff) return FALSE;
   return(TRUE);
}
```

Code Section C provides an example of the software code used to power down computer system 200 (step 430 of FIG. 4).

Code Section C—Power Down Computer System

```
UINT8 PROTOCOL::shutdown()
{
   ExitWindowsEx(EWX_SHUTDOWN|EWX_FORCE, 0);
   HANDLE hToken;
   TOKEN_PRIVILEGES tkp;
   if (OpenProcessToken (GetCurrentProcess(),
TOKEN_ADJUST_PRIVILEGES |
TOKEN_QUERY, &hToken) )
   {
      LookupPrivilegeValue( NULL, SE_SHUTDOWN_NAME,
&tkp.Privileges[0].Luid
);
      tkp.PrivilegeCount= 1;
      tkp.Privileges[0].Attributes = SE_PRIVILEGE_ENABLED;
      AdjustTokenPrivileges(hToken, FALSE, &tkp, 0,
```

-continued

```
    (PTOKEN_PRIVILEGES)NULL,
0);
        ExitWindowsEx(EWX_SHUTDOWN|EWX_FORCE, 0);
    }
    return SUCCESS;
}
```

In the present embodiment, the present invention utilizes a user-friendly graphical user interface (GUI) that enables the installer to issue commands, select options, and monitor the progress of the test. In the present embodiment, the GUI is window-based and is displayed to the installer on the display device (e.g., display device 105 of FIG. 1) of the computer system being tested. Using cursor control device 107 and/or alphanumeric input device 106 (FIG. 1) are used by the installer to communicate selections, including the desired delay time (step 425 of FIG. 4), to the present invention test method. In the present embodiment, it is only necessary for the installer to select desired options (for example, indicate whether or not to verify the availability of the computer systems per step 420 of FIG. 4), to start the test process, and to enter the delay time when prompted, although other types of GUIs may be employed in accordance with the present invention.

Figure 5:
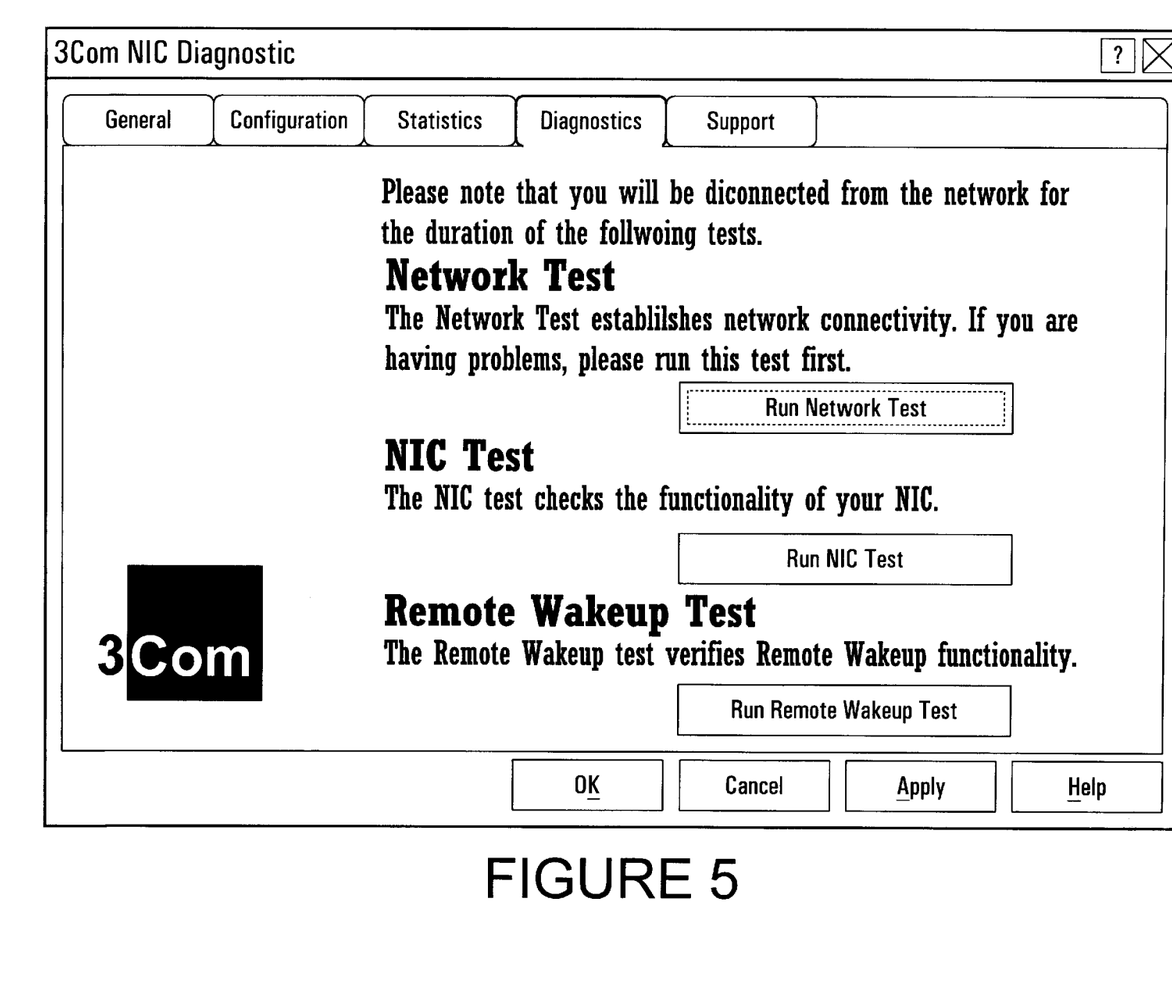
FIG. 5 shows a window displayed on a computer system's display device and used to begin the remote wake-up functional test in accordance with one embodiment of the present invention.

FIG. 5 shows an exemplary window that is displayed on the computer system's display device and is used by the installer to begin the remote wake-up function test in accordance with one implementation of the present invention. The installer clicks on the button labeled "Run Remote Wakeup Test" to verify that another computer system exists on the network with the capability to generate a test wake-up packet. In accordance with process 400, this aspect of the test is completed and a message appears stating that the remote wake-up test passed if another computer system exists on the network with the capability to generate a test wake-up packet is detected. A "Seconds Until Wakeup" entry box (not shown) is also then displayed in which the installer enters in the number of seconds that the computer system should be shut down until it receives a test wake-up packet from the remote computer system. The installer then clicks on a button labeled "Test Remote Wake Up Restart" (not shown) which causes the computer system to shut down. A successful test is observed by the installer when the computer system automatically powers on after the number of seconds specified.

In summary, the present invention provides a convenient, user-friendly and efficient method for performing a diagnostic test of the remote wake-up function installed on a computer system in a network. The test is initiated and executed from the computer system being tested, and thus the installer does not require access to another computer system on the network. The present invention advantageously utilizes the network resources already available, and hence requires neither the use of special equipment nor the installation of additional software on other computer systems on the network. The present invention automatically identifies the network resources needed to perform the test, and so there is no need for the installer to search out those resources or type in network addresses. Other computer systems that participate in the test are not affected by the test being performed, and consequently the users of those computer systems are not disturbed.

The preferred embodiment of the present invention, a method for self-initiated system event using network resources, is thus described. While the present invention has been described in particular embodiments, it should be appreciated that the present invention should not be construed as limited by such embodiments, but rather construed according to the following claims.

What is claimed is:

1. A method for testing a computer system comprising the steps of:

a) sending a broadcast message from said computer system and over a network of computer systems, said broadcast message including a network address of said computer system and requesting one or more directed responses from said network;

b) receiving, at said computer system, directed test wake-up packets representing said one or more of said directed responses;

c) based on said directed test wake-up packets, generating a list of computer systems, and a network address associated with each of said computer systems, that responded to said broadcast message;

d) sending, from said computer system, directed messages to a subset of said list of computer systems, said directed messages each requesting a delayed test wake-up packet;

e) powering down said computer system wherein said computer system comprises a circuit that is for performing a wake-up function; and f) waking up said computer system in response to said circuit receiving a delayed test wake-up packet.

2. The method as described in claim 1 wherein said delayed test wake-up packet is sent by a computer system of said subset of said list of computer systems.

3. The method as described in claim 1 wherein said network address of said computer system and said network address associated with each of said computer systems are ethernet addresses.

4. The method as described in claim 1 wherein said circuit is implemented within a network interface card (NIC) of said computer system.

5. The method as described in claim 1 further comprising the step of verifying the availability of said subset of said list of computer systems in advance of said step d) by performing the steps of:

sending, from said computer system, directed non-delay messages to said subset of said list of computer systems, said directed non-delay messages each requesting a non-delayed test wake-up packet; and checking said subset of said list of computer systems against any responses received by said computer system that were sent in response to said directed non-delay messages.

6. The method as described in claim 1 wherein said directed test wake-up packets each comprise a message packet including a wake-up code.

7. The method as described in claim 6 further comprising the step of identifying said directed test wake-up packets by recognizing said wake-up code.

8. In a network of computer systems, a method for performing a test function on a first computer system in said network, said method comprising the steps of:

a) said first computer system automatically identifying a second computer system in said network, said second computer system having the capability to send a test wake-up packet over said network;

b) said first computer system sending a request message to said second computer system requesting that said second computer system send said test wake-up packet to said first computer system, wherein said request message contains a network address of said first computer system;

c) said first computer system powering down; and d) said second computer system automatically sending said test wake-up packet to said first computer system over said network for testing a remote wake-up function of said first computer system.

9. The method as described in claim 8 wherein said first computer system is coupled to said network via a network interface card (NIC) configured to wake up said first computer system in response to said test wake-up packet.

10. The method as described in claim 8 wherein said test wake-up packet comprises a message packet including a wake-up code.

11. The method as described in claim 10 further comprising the step of identifying said test wake-up packet by recognizing said wake-up code.

12. The method as described in claim 8 wherein said step a) further comprises the steps of:

a1) sending a broadcast message over said network to said computer systems requesting that said computer systems send directed test wake-up packets to said first computer system;

a2) receiving from a subset of said computer systems a plurality of said directed test wake-up packets including a network address associated with each of said computer systems, and generating a list of network addresses of computer systems having said remote wake-up function; and a3) selecting said second computer system from said list.

13. The method as described in claim 12 wherein said network addresses are ethernet addresses.

14. The method as described in claim 8 wherein step b) further comprises the step of specifying a time delay after which said second computer system is to send said test wake-up packet.

15. The method as described in claim 14 further comprising the step of said first computer system verifying the availability of said second computer system in advance of said step b) by performing the step of:

sending a directed non-delay message to said second computer system, said directed non-delay message requesting that said second computer system send a non-delayed test wake-up packet to said first computer system.

16. The method of claim 8 further comprising the step of said test wake-up packet causing said first computer system to start up.

17. A computer system in a network comprising a plurality of computer systems, said computer system comprising:

a processor coupled to a bus; and a memory unit coupled to said bus and having stored therein instructions that when executed by said processor implement a method for testing said computer system, said method comprising the steps of:

sending a broadcast message from said computer system and over said network of computer systems, said broadcast message including a network address of said computer system and requesting one or more directed responses from said network;

receiving, at said computer system, directed test wake-up packets representing said one or more of said directed responses;

based on said directed test wake-up packets, generating a list of computer systems, and a network address associated with each of said computer systems, that responded to said broadcast message;

sending, from said computer system, directed messages to a subset of said list of computer systems, said directed messages each requesting a delayed test wake-up packet;

powering down said computer system wherein said computer system comprises a circuit that is for performing a wake-up function; and waking up said computer system in response to said circuit receiving a delayed test wake-up packet.

18. The computer system of claim 17 wherein said delayed test wake-up packet is sent by a computer system of said subset of said list of computer systems.

19. The computer system of claim 17 wherein said circuit is implemented within a network interface card (NIC) of said computer system.

20. The computer system of claim 17 wherein said network address of said computer system and said network address associated with each of said computer systems are ethernet addresses.

21. The computer system of claim 17 wherein said directed test wake-up packets each comprise a message packet including a wake-up code.

22. The computer system of claim 21 wherein said directed test wake-up packets are identified by recognizing said wake-up code.

23. The computer system of claim 17 wherein said computer system verifies the availability of said subset of said list of computer systems after generating said list by performing the steps of:

sending directed non-delay messages to said subset of said list of computer systems, said directed non-delay messages each requesting a non-delayed test wake-up packet; and checking said subset of said list of computer systems against any responses received by said computer system that were sent in response to said directed non-delay messages.

* * * * *